3,663,533
HYDRAZINE DERIVATIVES
Michio Nakanishi, 756 Shinborimachi, Nakatsu, Oita, Japan; Hiroshi Yuki, 1336 Oaza-Hirotsu, Yoshitomimachi, Chikujogun, Fukuoka, Japan; and Tomio Muro, 2275 Kanaya-Uenocho, Nakatsu, Oita, Japan
No Drawing. Filed May 6, 1970, Ser. No. 35,233
Claims priority, application Japan, May 6, 1969, 44/34,952
Int. Cl. C07d 93/42, 87/54, 53/00
U.S. Cl. 260—239.3          15 Claims

ABSTRACT OF THE DISCLOSURE

Hydrazine derivatives of the formula

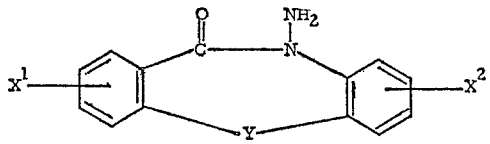

and pharmaceutically acceptable, acid-addition salts thereof, and wherein $X^1$ is H or Cl, $X^2$ is H, Cl, $CH_3O$ or $CF_3$ and Y is —O—, —S—, —$SO_2$—, —NH—, —N($CH_3$)—, —CO—, —$CH_2$—, —CH($CH_3$)— or —C($CH_3$)$_2$— are useful as antiepileptic agents.

---

This invention relates to novel and therapeutically valuable hydrazine derivatives.

The hydrazine derivatives of the present invention have the formula.

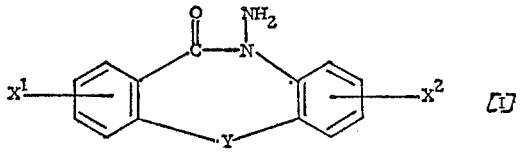

wherein $X^1$ is H or Cl, $X^2$ is H, Cl, $CH_3$, $CH_3O$ or $CF_3$ and Y is —O—, —S—, —$SO_2$—, —NH—, —N($CH_3$)—, —CO—, —$CH_2$—, —CH($CH_3$)— or —C($CH_3$)$_2$—.

Compounds in accordance with Formula I may be produced by the reaction of an alkali metal salt of a compound of the formula

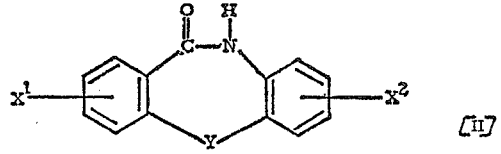

with O-(2,4-dinitrophenyl)hydroxylamine as an aminating agent.

This amination reaction is advantageously carried out in an inert solvent such as benzene, toluene, xylene, dioxane, tetrahydrofuran, dimethylformamide and the like at room temperature or at an elevated temperature.

The alkali metal salts of the starting compounds of Formula II can be produced by the following methods (a, b) in the presence of an inert solvent such as benzene, toluene, xylene, dioxane, tetrahydrofuran, dimethylformamide and the like:

(a) By the reaction of a compound of Formula II with a metallizing agent such as alkali metal amide (e.g. sodium amide, lithium amide) or alkali metal hydride (e.g. sodium hydride).

(b) By the reaction of a compound of the formula

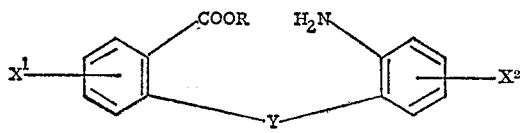

wherein R is alkyl of 1 to 4 carbon atoms, and $X^1$, $X^2$ and Y are as above defined, with an alkali metal amide (e.g. sodium amide).

The hydrazine derivatives of Formula I, as well as their pharmaceutically acceptable, acid-addition salts, have excellent antiepileptic action and are useful in the treatment of epileptic fits. For example, the compounds of Formula I listed below (A, B, C, D and E) have pharmacological properties as herein after set forth.

(A) 10-amino-7-chloro-10,11-dihydro-5H-dibenzo [b,e] [1,4] diazepin-11-one
(B) 10-amino-10,11-dihydrodibenzo [b,f] [1,4] thiazepin-11-one
(C) 10-amino-5-methyl-10,11-dihydro-5H-dibenzo [b,e] [1,4] diazepin-11-one
(D) 5-amino-5,6-dihydromorphantridine-6,11-dione
(E) 5-amino-11,11-dimethyl-5,6-dihydromorphanthridin-6-one

ANTISPASMODIC ACTION

The test compounds were administered intraperitoneally to dd-strain mice (male, 20–25 g.), each group consisting of six mice. After an hour, the silver electrode of the electroshock seizure apparatus (designed by Lowell A. Woodbury and Virginia D. Davenport: see, Archives Internationales de Pharmacodynamie et de Therapie, 1952, volume 42, pages 97–102.) was brought into contact with the cornea and an alternating current (2000 volts, 12.5 milliamperes) was appied for 0.2 second to induce spasm. The seizure rate was measured to prepare the dose response curve and determine the $ED_{50}$ value (the dose required to lower the seizure rate by 50% against the control mice). The results are shown in Table I.

TABLE I

| Compound: | $ED_{50}$ (mg./kg. body weight) |
|---|---|
| A | 120 |
| B | 120 |
| C | 30 |
| D | 120 |
| E | 60 |

TOXICITY

The $LD_{50}$ values of 10-amino-5-methyl-10,11-dihydro-5H-dibenzo [b,e] [1,4] diazepin-11-one in mice are as follows:

Intraperitoneal ≧320
Subcutaneous >320
Oral 320–640

$LD_{50}$ (mg./kg. body weight)
The compounds in accordance with Formula I and pharmaceutically acceptable, acid-addition salts thereof may be administered safely per se or in the form of a pharmaceutical composition in admixture with a suitable carrier or adjuvant, administrable orally, without causing harm to the host.

The pharmaceutical composition can take the form of tablets, granules, powders, etc. The following are examples of compositions of the invention which may be administered for pharmaceutical purposes.

(1) 250 mg. tablets are prepared from the following composition:

|  | Mg. |
|---|---|
| Compound C | 250 |
| Lactose | 50 |
| Starch | 18 |
| Microcrystalline cellulose | 10 |
| Magnesium stearate | 2 |
| Total | 330 |

(2) 50 wt. percent powders are prepared from the following composition:

|  | Wt. percent |
|---|---|
| Compound C | 50 |
| Lactose | 35 |
| Starch | 15 |
| Total | 100 |

As indicated above, the compounds of Formula I and their pharmaceutically acceptable, acid-addiction salts are useful antispasmodic agents and may be administered for this purpose to various mammalian species (e.g. cats, dogs, mice, horses, humans, etc.). For example, for this purpose, they may be administered, preferably orally, to mammals in a daily dosage of about 5 to 15 mg./kg. Thus, for example, the usual daily oral dosage for adult humans would be about 500 to 1000 mg. in single divided doses.

The following examples will further illustrate the present invention.

EXAMPLE 1

A mixture of 4.8 g. of 7-chloro-10,11-dihydro-5H-dibenzo[b,e][1,4]diazepin-11-one, 40 ml. of anhydrous dioxane and 0.86 g. of sodium amide is refluxed for 2 hours. After cooling and addition of 5 ml. of anhydrous dimethylformamide, there is added to the resulting mixture 4.4 g. of O-(2,4-dinitrophenyl)hydroxylamine at 20° C. The mixture is stirred for 2 hours at 20° C. and then poured into 100 ml. of water. The crystals formed are collected by filtration, washed with water, air-dried and recrystallized from ethyl acetate to give 4.9 g. of 10-amino-7-chloro-10,11-dihydro-5H-dibenzo[b,e,][1,4]diazepin - 11-one as pale yellow crystals melting at 206–207° C.

EXAMPLE 2

A mixture of 4.2 g. of 10,11-dihydrodibenz[b,f][1,4]oxazepin-11-one, 40 ml. of anhydrous dioxane and 0.9 g. of sodium amide is refluxed for 3 hours. After cooling and addition of 5 ml. of anhydrous dimethylformamide, there is added to the resulting mixture 4.4 g. of O-(2,4-dinitrophenyl)hydroxylamine. The mixture is stirred for 2 hours at room temperature, and then poured into 100 ml. of water. The crystals formed are collected by filtration. washed with water, air-dried and recrystallized from methanol to give 4 g. of 10-amino-10,11-dihydrodibenz[b,f][1,4]oxazepin-11-one as white crystals melting at 151–153° C.

EXAMPLE 3

A mixture of 6.5 g. of methyl o-(2-amino-4-trifluoromethylphenylthio)-benzoate, 40 ml. of anhydrous dioxane and 0.9 g. of sodium amide is refluxed for 4 hours. After cooling to room temperature and addition of 5 ml. of anhydrous dimethylformamide, there is added to the resulting mixture 4.4 g. of O-(2,4-dinitrophenyl)hydroxylamine at 20° C. The resulting mixture is stirred for 2 hours at room temperature, and then poured into 100 ml. of water. The crystals formed are collected by filtration, washed with water, air-dried and recrystallized from ethanol to give 5.4 g. of 10-amino-8-trifluoromethyl-10,11-dihydrodibenzo[b,f][1,4]thiazepin-11-one as white needles melting at 142–145° C.

EXAMPLE 4

A mixture of 4.4 g. of 5,6-dihydromorphanthridine-6,11-dione, 40 ml. of anhydrous dioxane and 0.9 g. of sodium amide is refluxed for 3 hours. After cooling and addition of 5 ml. of anhydrous dimethylformamide, there is added to the resulting mixture 4.4 g. of O-(2,4-dinitrophenyl)hydroxylamine at 20° C. The mixture is stirred for 2 hours at 20° C., and then poured into 100 ml. of water. The crystals formed are collected by filtration, washed with water, air-dried and recrystallized from ethanol to give 4.2 g. of 5-amino-5,6-dihydromorphanthridine-6,11-dione melting at 153–156° C.

EXAMPLE 5

A mixture of 4.4 g. of 11-methyl-5,6-dihydromorphanthridin-6-one, 40 ml. of anhydrous dioxane and 0.9 g. of sodium amide is refluxed for 3 hours. After cooling and addition of 5 ml. of anhydrous dimethylformamide, there is added to the resulting mixture 4.4 g. of O-(2,4-dinitrophenyl)hydroxylamine at 20° C. The mixture is stirred for 2 hours at 20° C., and then poured into 100 ml. of water. The crystals formed are collected by filtration, washed with water, air-dried and recrystallized from methanol to give 4.1 g. of 5-amino-11-methyl-5,6-dihydromorphanthridin-6-one melting at 142–145° C.

EXAMPLE 6

A mixture of 4.6 g. of 11,11-dimethyl-5,6-dihydromorphanthridin-6-one, 50 ml. of anhydrous dioxane and 0.9 g. of sodium amide is stirred for 4 hours at room temperature. To the reaction mixture is added 4.4 g. of O-(2,4-dinitrophenyl)hydroxylamine and stirred for 1 hour at 20° C. Then the reacting products are poured into 150 ml. of water. The crystals formed are collected by filtration, washed with water, air-dried and recrystallized from ethanol to give 4.3 g. of 5-amino-11,11-dimethyl-5,6-dihydromorphanthridin-6-one melting at 223–225° C.

EXAMPLES 7–13

Following the procedures of above examples, but substituting equivalent amounts of appropriate starting materials, the following hydrazine derivatives are also produced:

(7) 10-amino - 10,11 - dihydrodibenzo[b,f][1,4]thiazepin-11-one, white needles melting at 173–174.5° C.;

(8) 10-amino-8-methyl-10,11-dihydrodibenzo[b,f][1,4]thiazepin-11-one, white needles melting at 178–182° C.;

(9) 10-amino-5-methyl-10,11-dihydro-5H-dibenzo[b,e][1,4]diazepin-11-one, yellow crystals melting at 176–179° C.;

(10) 10-amino-7-methoxy-10,11 - dihydrodibenzo[b,f][1,4]thiazepin-11-one, white needles melting at 153–156° C.;

(11) 10-amino-2-chloro - 10,11 - dihydrodibenzo[b,f][1,4]oxazepin-11-one melting at 130–132° C.;

(12) 10-amino-10,11 - dihydrodibenzo[b,f][1,4]thiazepin-11-one-5,5-dioxide melting at 234–236° C.; and

(13) 5-amino-5,6-dihydromorphanthridin-6-one melting at 170–173° C.

What is claimed is:

1. A hydrazine of the formula

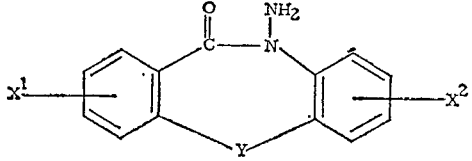

and pharmaceutically acceptable, acid-addition salts thereof, wherein $X^1$ is H or Cl, $X^2$ is H, Cl, $CH_3$, $CH_3O$ or $CF_3$ and Y is —O—, —S—, —SO$_2$—, —NH—, —N(CH$_3$)—, —CO—, —CH$_2$—, —CH(CH$_3$)— or —C(CH$_3$)$_2$—.

2. A compound according to claim 1 having the name 10-amino-7-chloro-10,11-dihydro - 5H - dibenzo[b,e][1,4]diazepin-11-one.

3. A compound according to claim 1 having the name 10-amino-10,11 - dihydrodibenzo[b,f][1,4]oxazepin - 11-one.

4. A compound according to claim 1 having the name 10-amino-8-trifluoromethyl - 10,11 - dihydrodibenzo[b,f][1,4]thiazepin-11-one.

5. A compound according to claim 1 having the name 10-amino-10,11 - dihydrodibenzo[b,f][1,4]thiazepin - 11-one.

6. A compound according to claim 1 having the name 10-amino-8-methyl - 10,11 - dihydrodibenzo[b,f][1,4]thiazepin-11-one.

7. A compound according to claim 1 having the name 10-amino-5-methyl-10,11-dihydro-5H - dibenzo[b,e][1,4]diazepin-11-one.

8. A compound according to claim 1 having the name 10-amino-7-methoxy-10,11 - dihydrodibenzo[b,f][1,4]thiazepin-11-one.

9. A compound according to claim 1 having the name 5-amino-5,6-dihydromorphanthridine-6,11-dione.

10. A compound according to claim 1 having the name 5-amino-11-methyl-5,6-dihydromorphanthridin-6-one.

11. A compound according to claim 1 having the name 5-amino-11,11-dimethyl-5,6 - dihydromorphanthridin - 6-one.

12. A compound according to claim 1 having the name 10-amino-2-chloro-10,11 - dihydrodibenzo[b,f][1,4]oxazepin-11-one.

13. A compound according to claim 1 having the name 10-amino-10,11 - dihydrodibenzo[b,f][1,4]thiazepin - 11-one-5,5-dixoide.

14. A compound according to claim 1 having the name 5-amino-5,6-dihydromorphanthridin-6-one.

15. A method for producing a hydrazine derivative in accordance with claim 1 which comprises reacting a compound of the formula

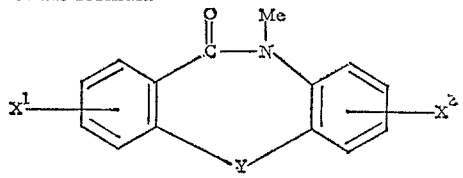

wherein Me is alkali metal and X$^1$, X$^2$ and Y are as defined in claim 1, with O-(2,4-dinitrophenyl)hydroxylamine.

References Cited
UNITED STATES PATENTS 3,531,472  9/1970  Nakanishi et al. __ 260—239.3 T HENRY R. JILES, Primary Examiner R. T. BOND, Assistant Examiner U.S. Cl. X.R.

424—244, 275